(No Model.) 2 Sheets—Sheet 2.
P. H. ADAMS, Jr. & O. T. X. ADAMS.
APPARATUS FOR USE IN DECOMPOSING METALLIC SALTS AND DESULPHURIZING ORES.
No. 399,121. Patented Mar. 5, 1889.
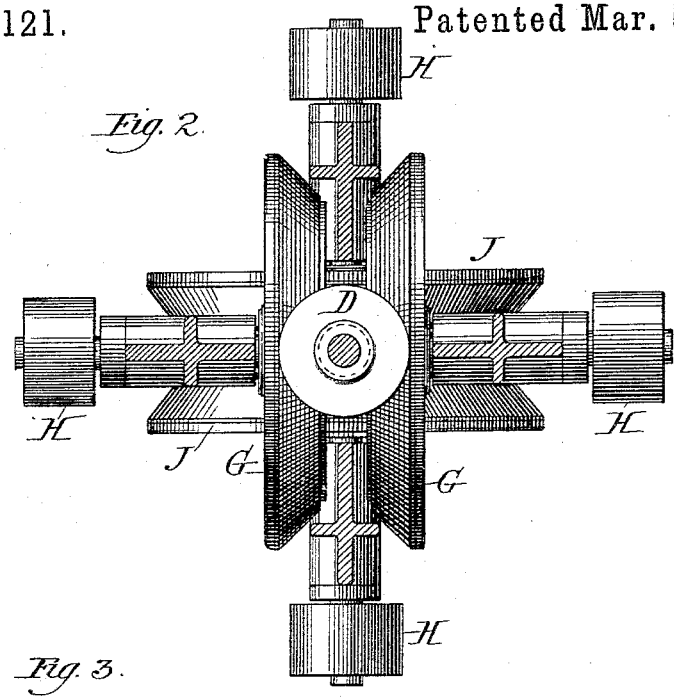
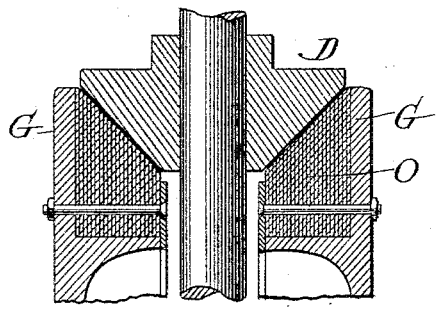
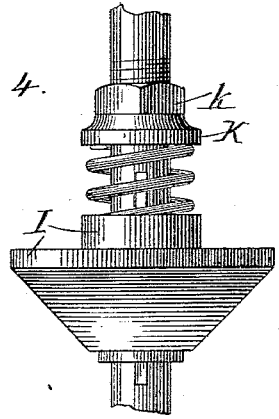
Witnesses:
Frank J. Blanchard
Fred Gerlach
Inventors:
Phineas H. Adams Jr.
Orsemas T. X. Adams,
By Banning & Banning & Payson.
Attorneys.

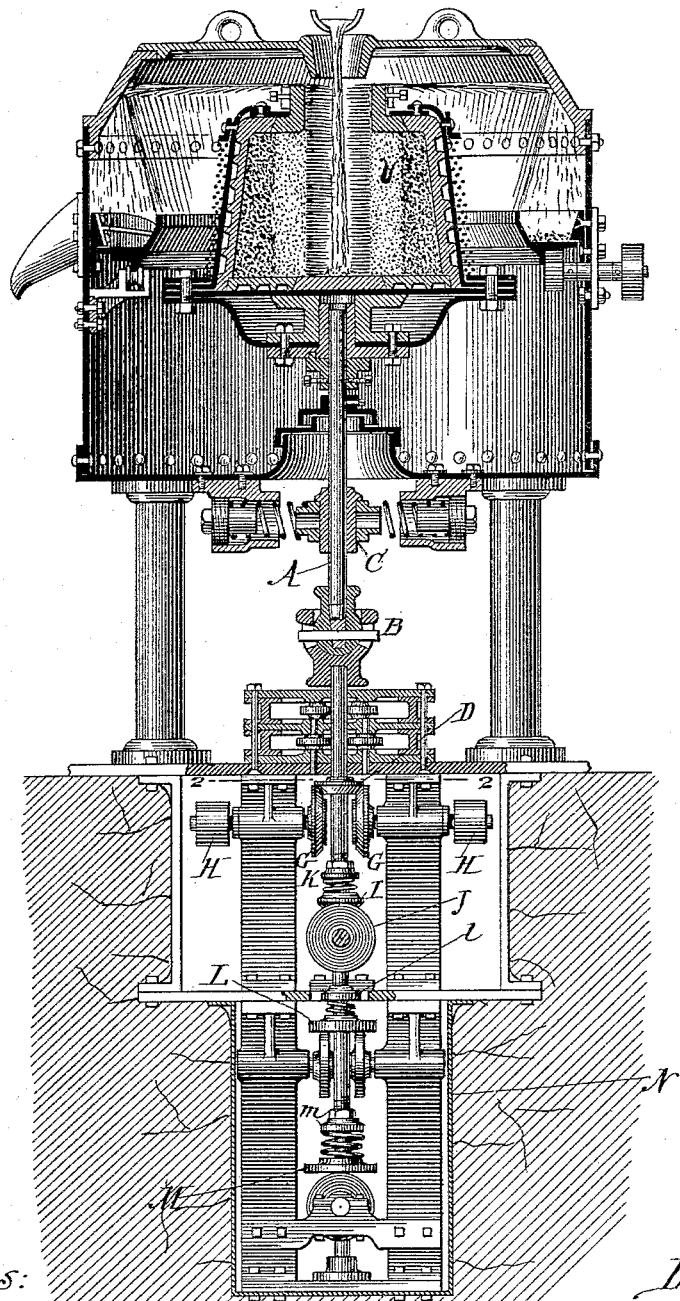

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

APPARATUS FOR USE IN DECOMPOSING METALLIC SALTS AND DESULPHURIZING ORES.

SPECIFICATION forming part of Letters Patent No. 399,121, dated March 5, 1889.

Application filed January 3, 1889. Serial No. 295,367. (No model.)

*To all whom it may concern:*

Be it known that we, PHINEAS H. ADAMS, Jr., and ORSEMAS T. X. ADAMS, citizens of the United States, residing at Chicago, Illinois, have invented certain new and useful Improvements in Apparatus for Use in Decomposing Metallic Salts and Desulphurizing Ores, of which the following is a specification.

The object of our invention is to improve an apparatus for mechanically decomposing chemical compounds, metallic salts, and desulphurizing ores or their resulting material, when the substances treated are in a molten condition, by the action of centrifugal force, and our invention has more particular reference to the running-gear employed in such apparatus.

In the drawings, Figure 1 is a vertical section of the apparatus, showing most of the running-gear in elevation. Fig. 2 is a plan view taken in line 2 2 of Fig. 1, and Figs. 3 and 4 are details of some of the parts hereinafter described.

In making our improved apparatus for decomposing chemical compounds, metallic salts, or salts of metal, and desulphurizing ores, we make a receiving-vessel, V, constructed and adapted to receive the substances to be treated when in a molten condition. This receiving-vessel is mounted and rests upon an actuating-shaft, to which it is fixed or keyed in such a way that by the rotation of the shaft the receiving-vessel will be revolved. The receiving-vessel may be made in such a way as will secure the required strength and reduce the conduction of heat from the interior to the exterior. It may be surrounded by a curbing and have a removable bottom to facilitate the removal of the material which is not thrown off at the top by the action of centrifugal force, and in other respects it may be made as will be calculated to subserve the end in view and permit of its being rotated at a high rate of speed for the separation of particles of different degrees of density in the matter treated. Many of these parts and the details of their construction, as they do not form the subject-matter of our present claim, need not be more fully described, as they will be sufficiently understood from an inspection of the drawings.

The actuating-shaft A, which serves to rotate the receiving-vessel, is preferably provided with a flexible joint or coupling, B, to enable its upper portion to have a sufficient lateral play to accommodate it to the vibrations of the receiving-vessel when rotated at a high rate of speed. To assist in maintaining it in its position and restore it to its vertical position as it vibrates from one side to the other, a laterally-yielding journal, C, may be provided, as shown in Fig. 1. The lower portion of the actuating-shaft is rigidly maintained in its vertical position by any proper boxing, of which one kind is shown in the drawings.

In order to rotate the actuating-shaft with its superimposed load, which we prefer to do in this case without the use of bands or belts directly operating upon such shaft, which produce lateral friction by drawing the actuating-shaft in the direction toward which the band is pulling, we prefer to provide the actuating-shaft with a disk, D, fixed or keyed to such shaft and rotating with the same. As shown in the drawings, this disk is beveled on the under side, although it is immaterial whether the under or the upper side is beveled, so far as the rotation of the shaft is concerned. We prefer, however, to bevel it on the under side, as in that case we can utilize it as a means of assisting in sustaining the weight of the actuating-shaft and its superimposed load; but, whichever side of the disk be beveled, we arrange wheels G preferably in a vertical position, and with their sides next to the horizontal disk D beveled, so that the bevels of the wheels and disk will be in contact with each other. The object of beveling these various contact-surfaces is to secure a proper frictional contact between them to constantly operate to rotate the disk on the actuating-shaft without a counter-friction between them, although any other means of arranging the frictional surfaces between the wheels and disks to transmit the power to the rotation of the actuating-shaft may be employed, if preferred, so long as the desired frictional contact is secured. An obvious way of arranging the wheels and disks to secure this result is to place them horizontally or in the same plane, with their peripheries bearing against each other. These wheels G may be supported on shafts journaled in the framework, as shown in Fig. 1, or in any other suitable manner, and they may be rotated by rotating the shafts on which they are fixed by belts, bands, or other suitable means from any desired source of power. In the drawings we have shown belt-surfaces H as a convenient means of transmitting the power to the wheels G. We preferably employ more than one set of propelling wheels and disks, and so in Fig. 1 have shown another disk, I, on the actuating-shaft and beveled wheels J arranged in contact with it, as above explained, to rotate or drive the disk I. This set of propelling wheels and disks may correspond in all essential respects with the ones above described, though we prefer to arrange the disk I on the actuating-shaft in a way that will enable it to be movable vertically on the shaft while rotating with it. We also prefer to arrange a shoulder or collar, K, on the actuating-shaft, with a spring interposed between the disk and the collar or shoulder. We also prefer to make the shoulder vertically adjustable, and to that end we have shown a nut, $k$, by which it may be moved up or down. In this way the tension of the spring interposed between it and the disk may be adjusted from time to time and the frictional surfaces brought into greater or less yieldable frictional contact, as desired. By the use of this spring the amount of the weight of the actuating-shaft and its superimposed load that it is desirable to support on the wheels may also be determined and regulated. However the wheels and disks may be located, the spring should be arranged to hold their frictional surfaces in yieldable contact with each other.

In order to still further divide the weight of the actuating-shaft and its superimposed load, and thus prevent extreme or injurious friction at any one point, we prefer to employ one or more other disks, as L and M, keyed to the actuating-shaft, so as to rotate therewith, but vertically movable thereon, and to provide the actuating-shaft with collars or shoulders, as $l$ and $m$, adjustable up or down by means of nuts, as explained in reference to the collar or shoulder K. Between these collars or shoulders and the disks L and M, if both be used, we interpose springs, as shown in Fig. 1, whose tension may be regulated and adjusted so as to determine the amount of the weight of the actuating-shaft and its superimposed load that will rest upon the vertical wheels or disks arranged below the disks L and M. As these various disks and their arrangement will be readily understood from an inspection of the drawings, we need not describe them minutely or in detail. In this way the bearing which sustains the weight of the actuating-shaft and its superimposed load may be divided as often as desired, so that at no one point will there be produced extreme and injurious friction. We prefer to inclose the frame containing the bearing with the disks L and M with a casing N, which may be filled with a lubricant, so as to constantly keep both the horizontal and the vertical wheels and disks located therein lubricated and in the best condition to prevent friction.

In making the propelling disks and wheels as above described we prefer to make the ones on the actuating-shaft of metal or hard material and provide the others with a more yieldable friction contact-surface, as leather, wood, or paper, so that there will be as much friction secured between the parts as possible. This is shown in Fig. 3, where a leather surface is represented as O.

What we regard as new, and desire to secure by Letters Patent, is—

In an apparatus for decomposing metallic salts or salts of metals and desulphurizing ores when in a molten state, the combination of a revoluble receiving-vessel adapted to receive molten material to be treated, a revoluble actuating-shaft rotating said vessel as it revolves, a bearing for supporting the actuating-shaft and its superimposed load, comprising vertical wheels arranged in suitable bearings and a horizontal disk arranged on the actuating-shaft and rotating as it revolves and resting upon the upper peripheries of the vertical wheels, a spring arranged on the actuating-shaft above the disk, with its upper end against a vertically-adjustable collar or stop, whereby the tension of the spring may be increased or diminished, and means for rotating the actuating-shaft, comprising a rotating frictional surface bearing against the frictional surface on the actuating-shaft and rotating it, substantially as described.

PHINEAS H. ADAMS, Jr.
ORSEMAS T. X. ADAMS.

Witnesses:
THOMAS A. BANNING,
EPHRAIM BANNING.